(12) United States Patent
Riley

(10) Patent No.: US 9,100,551 B2
(45) Date of Patent: Aug. 4, 2015

(54) VIDEO POLICY SERVER

(75) Inventor: Yusun Kim Riley, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 0 days.

(21) Appl. No.: 12/646,542

(22) Filed: Dec. 23, 2009

(65) Prior Publication Data

US 2010/0306369 A1 Dec. 2, 2010

Related U.S. Application Data

(63) Continuation of application No. 11/041,779, filed on Jan. 24, 2005, now abandoned.

(60) Provisional application No. 60/538,803, filed on Jan. 23, 2004, provisional application No. 60/538,802, filed on Jan. 23, 2004.

(51) Int. Cl.
*H04N 7/173* (2011.01)
*H04L 12/54* (2013.01)
(Continued)

(52) U.S. Cl.
CPC ........ *H04N 7/17336* (2013.01); *H04L 12/5695* (2013.01); *H04L 47/10* (2013.01); *H04L 47/724* (2013.01); *H04L 47/781* (2013.01); *H04L 47/821* (2013.01); *H04N 21/2225* (2013.01); *H04N 21/2381* (2013.01); *H04N 21/2385* (2013.01); *H04N 21/2402* (2013.01); *H04N 21/47202* (2013.01)

(58) Field of Classification Search
USPC .............................................. 725/91, 95–96
See application file for complete search history.

(56) References Cited

U.S. PATENT DOCUMENTS 5,809,239 A * 9/1998 Dan et al. ...................... 709/203
5,822,534 A 10/1998 Yamunachari et al.
(Continued)

FOREIGN PATENT DOCUMENTS

AU 2004247256 B2 11/2010
AU 2005208846 B2 2/2011
(Continued)

OTHER PUBLICATIONS

Final Official Action for U.S. Appl. No. 12/051,374 (Jul. 11, 2011).
(Continued)

*Primary Examiner* — Jonathan V Lewis
(74) *Attorney, Agent, or Firm* — Jenkins, Wilson, Taylor & Hunt, P.A.

(57) ABSTRACT

A system for distributing digital content includes two or more digital content sources. Each source has a separate session manager that is distinct from other session managers associated with other digital content sources. The system further includes at least one set of network resources that receive digital content from the two or more digital content sources, modulate the digital content onto a carrier signal suitable for transmission over an access network, and transmit the carrier signal over the access network. The system also includes a receiving device for terminating the carrier signal. The receiving device generates a digital content stream corresponding to the digital content from the two or more digital content sources. The system further includes a policy server for allocating bandwidth of the network resources to the digital content sources, and for monitoring a utilization state of the network resources.

26 Claims, 4 Drawing Sheets

(51) Int. Cl.

| | |
|---|---|
| *H04L 12/801* | (2013.01) |
| *H04L 12/913* | (2013.01) |
| *H04L 12/911* | (2013.01) |
| *H04N 21/2225* | (2011.01) |
| *H04N 21/2381* | (2011.01) |
| *H04N 21/2385* | (2011.01) |
| *H04N 21/24* | (2011.01) |
| *H04N 21/472* | (2011.01) |

(56) References Cited

U.S. PATENT DOCUMENTS

| | | | |
|---|---|---|---|
| 5,835,720 A | 11/1998 | Nelson | |
| 5,878,115 A | 3/1999 | Valentine et al. | |
| 5,926,463 A | 7/1999 | Ahearn et al. | |
| 6,023,725 A * | 2/2000 | Ozawa et al. | 709/219 |
| 6,046,981 A | 4/2000 | Ramamurthy et al. | |
| 6,067,457 A | 5/2000 | Erickson et al. | |
| 6,076,108 A * | 6/2000 | Courts et al. | 709/227 |
| 6,128,644 A * | 10/2000 | Nozaki | 709/203 |
| 6,130,898 A | 10/2000 | Kostreski et al. | |
| 6,167,445 A * | 12/2000 | Gai et al. | 709/223 |
| 6,201,790 B1 | 3/2001 | Teboul | |
| 6,324,184 B1 | 11/2001 | Hou et al. | |
| 6,366,577 B1 | 4/2002 | Donovan | |
| 6,385,454 B1 | 5/2002 | Bahl et al. | |
| 6,463,454 B1 * | 10/2002 | Lumelsky et al. | 718/105 |
| 6,490,727 B1 * | 12/2002 | Nazarathy et al. | 725/129 |
| 6,571,288 B1 * | 5/2003 | Sarukkai | 709/226 |
| 6,578,076 B1 | 6/2003 | Putzolu | |
| 6,594,826 B1 | 7/2003 | Rao et al. | |
| 6,597,920 B2 | 7/2003 | Yegani et al. | |
| 6,680,922 B1 | 1/2004 | Jorgensen | |
| 6,708,209 B1 | 3/2004 | Ebata et al. | |
| 6,728,887 B1 | 4/2004 | Dziekan et al. | |
| 6,731,932 B1 | 5/2004 | Rune et al. | |
| 6,738,390 B1 | 5/2004 | Xu et al. | |
| 6,745,043 B1 | 6/2004 | Lester et al. | |
| 6,771,595 B1 | 8/2004 | Gilbert et al. | |
| 6,771,639 B1 | 8/2004 | Holden | |
| 6,798,757 B2 | 9/2004 | Mizutani | |
| 6,804,717 B1 | 10/2004 | Bakshi et al. | |
| 6,898,641 B1 | 5/2005 | Kobayashi | |
| 6,930,984 B1 * | 8/2005 | Nomura et al. | 370/254 |
| 6,947,378 B2 | 9/2005 | Wu et al. | |
| 6,973,488 B1 * | 12/2005 | Yavatkar et al. | 709/223 |
| 6,975,594 B1 | 12/2005 | Byers | |
| 6,988,148 B1 | 1/2006 | Sheth | |
| 7,024,199 B1 | 4/2006 | Massie et al. | |
| 7,027,391 B2 | 4/2006 | Sahinoglu et al. | |
| 7,113,502 B2 * | 9/2006 | Oz et al. | 370/254 |
| 7,126,920 B2 | 10/2006 | Venkatesulu et al. | |
| 7,139,813 B1 | 11/2006 | Wallenius | |
| 7,143,433 B1 * | 11/2006 | Duan et al. | 725/115 |
| 7,168,086 B1 | 1/2007 | Carpenter et al. | |
| 7,174,375 B2 | 2/2007 | King et al. | |
| 7,236,791 B2 | 6/2007 | Chambers et al. | |
| 7,274,662 B1 | 9/2007 | Kalmanek, Jr. et al. | |
| 7,319,691 B2 | 1/2008 | Qing et al. | |
| 7,330,710 B1 | 2/2008 | Xu et al. | |
| 7,430,187 B2 * | 9/2008 | Holt et al. | 370/329 |
| 7,451,475 B1 | 11/2008 | Oz et al. | |
| 7,535,888 B1 * | 5/2009 | Carlucci et al. | 370/352 |
| 7,738,440 B2 | 6/2010 | Riley et al. | |
| 7,805,515 B2 | 9/2010 | Riley | |
| 7,904,541 B2 * | 3/2011 | Swildens et al. | 709/223 |
| 8,595,787 B2 | 11/2013 | Riley et al. | |
| 8,619,630 B2 | 12/2013 | Riley et al. | |
| 8,750,279 B2 | 6/2014 | Riley et al. | |
| 2001/0042097 A1 * | 11/2001 | Lapine | 709/206 |
| 2001/0055305 A1 * | 12/2001 | Oz et al. | 370/389 |
| 2002/0010938 A1 | 1/2002 | Zhang et al. | |
| 2002/0029274 A1 * | 3/2002 | Allen | 709/226 |
| 2002/0032794 A1 | 3/2002 | Nishida et al. | |
| 2002/0036983 A1 | 3/2002 | Widegren et al. | |
| 2002/0042924 A1 | 4/2002 | Adams | |
| 2002/0059274 A1 | 5/2002 | Hartsell | |
| 2002/0059638 A1 * | 5/2002 | Oz et al. | 725/129 |
| 2002/0087995 A1 * | 7/2002 | Pedlow, Jr. | 725/87 |
| 2002/0122422 A1 | 9/2002 | Kenney et al. | |
| 2002/0126633 A1 | 9/2002 | Mizutani et al. | |
| 2002/0126699 A1 | 9/2002 | Cloonan | |
| 2002/0150044 A1 | 10/2002 | Wu et al. | |
| 2002/0151312 A1 | 10/2002 | Rosemarijn Bos et al. | |
| 2002/0169794 A1 | 11/2002 | Jones | |
| 2003/0055971 A1 * | 3/2003 | Menon | 709/226 |
| 2003/0069954 A1 | 4/2003 | Ma | |
| 2003/0069972 A1 * | 4/2003 | Yoshimura et al. | 709/226 |
| 2003/0086425 A1 | 5/2003 | Bearden et al. | |
| 2003/0204856 A1 | 10/2003 | Buxton | |
| 2003/0208609 A1 | 11/2003 | Brusca | |
| 2003/0217368 A1 | 11/2003 | Ramaswamy | |
| 2003/0229692 A1 | 12/2003 | Vo | |
| 2004/0015986 A1 * | 1/2004 | Carver et al. | 725/36 |
| 2004/0039803 A1 | 2/2004 | Law | |
| 2004/0044762 A1 | 3/2004 | Peacock | |
| 2004/0083267 A1 | 4/2004 | Thompson | |
| 2004/0088730 A1 * | 5/2004 | Gopalan et al. | 725/93 |
| 2004/0125779 A1 | 7/2004 | Kelton et al. | |
| 2004/0213166 A1 | 10/2004 | Rambaldi | |
| 2004/0225687 A1 | 11/2004 | Larsson et al. | |
| 2005/0039213 A1 | 2/2005 | Matarese et al. | |
| 2005/0053085 A1 | 3/2005 | Doh et al. | |
| 2005/0076336 A1 | 4/2005 | Cutrell et al. | |
| 2005/0091505 A1 * | 4/2005 | Riley et al. | 713/182 |
| 2005/0120128 A1 | 6/2005 | Willes et al. | |
| 2005/0125832 A1 * | 6/2005 | Jost et al. | 725/95 |
| 2005/0149940 A1 * | 7/2005 | Calinescu et al. | 718/104 |
| 2005/0163060 A1 * | 7/2005 | Riley et al. | 370/254 |
| 2005/0188415 A1 | 8/2005 | Riley | |
| 2005/0289619 A1 | 12/2005 | Melby | |
| 2006/0038877 A1 | 2/2006 | Richardson et al. | |
| 2006/0068762 A1 | 3/2006 | Baldwin et al. | |
| 2007/0043558 A1 | 2/2007 | Scharz et al. | |
| 2007/0047478 A1 | 3/2007 | Balachandran et al. | |
| 2007/0149203 A1 | 6/2007 | Sliva | |
| 2008/0125152 A1 | 5/2008 | Hou | |
| 2008/0151881 A1 * | 6/2008 | Liu et al. | 370/389 |
| 2009/0196269 A1 | 8/2009 | Agarwal et al. | |
| 2010/0306369 A1 * | 12/2010 | Riley | 709/224 |
| 2010/0316064 A1 | 12/2010 | Riley et al. | |

FOREIGN PATENT DOCUMENTS

| | | |
|---|---|---|
| AU | 2005208847 B2 | 3/2011 |
| CA | 2 276 526 A1 | 7/1998 |
| CA | 2 528 871 | 1/2014 |
| CA | 2 528 648 | 4/2014 |
| EP | 1 631 917 B1 | 12/2010 |
| JP | 4582346 | 9/2010 |
| KR | 10-2001-0027383 | 4/2001 |
| WO | WO 00/11879 | 3/2000 |
| WO | WO 00/79794 A2 | 12/2000 |
| WO | WO 03/009629 | 1/2003 |
| WO | WO 03/014958 A1 | 2/2003 |
| WO | WO 03/042856 A2 | 5/2003 |
| WO | WO 03/052993 A2 | 6/2003 |
| WO | WO 2005/033899 A2 | 4/2005 |
| WO | WO 2005/072321 A2 | 8/2005 |

OTHER PUBLICATIONS

Interview Summary for U.S. Appl. No. 12/051,374 (Mar. 3, 2011).
Official Action for U.S. Appl. No. 12/051,374 (Jan. 10, 2011).
Communication of European publication number and information on the application of Article 67(3) EPC for European application No. 09709156.5 (Oct. 13, 2010).
Notification of Transmittal of the International Search Report and the Written Opinion of the International Searching Authority, or the Declaration of International Application No. PCT/US2009/032746 (Aug. 26, 2009).
Official Action for U.S. Appl. No. 10/867,159 (Mar. 21, 2011).
Certificate of Patent for Japanese Patent Application No. 2006-551387 (Dec. 24, 2010).

(56) References Cited

OTHER PUBLICATIONS

Official Action for Japanese Application No. 2006-551384 (Dec. 20, 2010).
Notice of Acceptance for Australian Patent Application No. 2005208847 (Nov. 22, 2010).
Allowance Notice for Japanese Patent Application No. 2006-551387 (Nov. 16, 2010).
Notice of Acceptance for Australian Patent Application No. 2005208846 (Oct. 27, 2010).
Examiner's Report for Australian Patent Application No. 2005208847 (Oct. 14, 2010).
Supplementary European Search Report for European Application No. 05706071.7 (Sep. 8, 2010).
Notice of Allowance for JP 2006-533793 (Jul. 20, 2010).
Official Action for U.S. Appl. No. 10/867,159 (Jul. 19, 2010).
Examiner's Answer for U.S. Appl. No. 10/867,157 (Jul. 8, 2010).
Official Action for Japanese Patent Application No. 2006-551387 (Jul. 6, 2010).
Communication under Rule 71(3)EPC for European Application No. 04755299.7 (Jun. 21, 2010).
Supplemental Notice of Allowability for U.S. Appl. No. 11/041,918 (Jun. 10, 2010).
Communication pursuant to Article 94(3) EPC for European application No. 04755130.4 (Apr. 27, 2010).
Notice of Allowance and Fee(s) Due for U.S. Appl. No. 11/041,918 (Apr. 21, 2010).
Official Action for Japanese Patent Application No. 2006-551387 (Mar. 15, 2010).
Notice of Allowance and Fee(s) Due for U.S. Appl. No. 10/867,158 (Jan. 15, 2010).
Notice of Panel Decision from Pre-Appeal Brief Review for U.S. Appl. No. 10/867,157 (Dec. 18, 2009).
Advisory Action for U.S. Appl. No. 10/867,157 (Sep. 23, 2009).
Japanese Official Action issued for 2006-533793, 1 page (Sep. 15, 2009).
Non-Final Official Action for U.S. Appl. No. 11/041,918 (Aug. 25, 2009).
Notice of Allowance and Fee(s) Due for U.S. Appl. No. 10/867,158 (Aug. 5, 2009).
Final Official Action for U.S. Appl. No. 11/041,779 (Jun. 24, 2009).
European Search Report issued for European Application No. 05797862 (Jun. 3, 2009).
Final Official Action for U.S. Appl. No. 10/867,157 (Apr. 17, 2009).
Examiner's Report for Australian Patent Application No. 2005208847 (Feb. 27, 2009).
Examiner's First Report for Australian Patent Application No. 2005208846 (Jan. 15, 2009).
Final Official Action for U.S. Appl. No. 11/041,918 (Dec. 22, 2008).
Australian Examiner's Report issued for Application No. 2004247256 (Nov. 18, 2008).
Advisory Action for U.S. Appl. No. 10/867,159 (Oct. 22, 2008).
Official Action for U.S. Appl. No. 10/867,158 (Oct. 17, 2008).
Supplementary European Search Report for European Application No. EP05706073.3 (Oct. 6, 2008).
Official Action for U.S. Appl. No. 10/867,157 (Sep. 26, 2008).
Non-Final Official Action for U.S. Appl. No. 11/041,779 (Aug. 21, 2008).
Final Official Action for U.S. Appl. No. 10/867,159 (May 16, 2008).
Non-Final Official Action for U.S. Appl. No. 11/041,918 (May 6, 2008).
Final Official Action for U.S. Appl. No. 10/867,157 (Mar. 24, 2008).
Official Action for U.S. Appl. No. 10/867,159 (Oct. 4, 2007).
Official Action for U.S. Appl. No. 10/867,157 (Sep. 20, 2007).
European Patent Office, Supplementary European Search Report for European Patent Application No. 04755130.4 (Sep. 4, 2007).
Notification of Transmittal of the International Search Report and the Written Opinion of the International Searching Authority, or the Declaration for International Application No. PCT/US05/02260 (Apr. 26, 2007).
European Search Report for European Application No. 04755299.7 (Mar. 23, 2007).
Notification of European publication number and information on the application of Article 67(3) EPC for European Application No. 05706073.3 (Nov. 15, 2006).
Notification of Transmittal of the International Search Report and the Written Opinion of the International Search Authority, or the Declaration (Sep. 7, 2006).
Notification of European publication number and information on the application of Article 67(3) EPC for European Application No. 05706071.7 (Sep. 6, 2006).
"Data Over Cable System Interface Specification Quality of Service Management Information Base (DOCSIS-QOS MIB)," (Feb. 2005).
International Search Report for International Application No. PCT/US04/19024 (Dec. 9, 2004).
"PacketCable Dynamic Quality-of-Service-Specification," PKT-SP-DQOS-I09-040402, I09 (Apr. 2, 2004).
"PacketCable Multimedia Architecture Framework Technical Report," PKT-TR-MM-ARCH-V01-030627, V01 (Jun. 27, 2003).
"PacketCable Multimedia Specification," PKT-SP-MM-I01-030627, I01 (Jun. 27, 2003).
"SIP: Session Initiation Protocol," RFC 3261 (Jun. 2002).
Kutscher et al., "Session Description and Capability Negotiation Draft-IETF-MUSIC-SDPNG-03. TXT" IETF Request for Comments, pp. 1-61, XP002205059 (Nov. 21, 2001).
Ed Miller et al., "The PacketCable Architecture," IEEE Communications Magazine, IEEE Service Center, Piscataway, US, vol. 39, No. 6, pp. 90-96, XP011091736 ISSN: 0163-6804 (Jun. 2001).
"PacketCable 1.2 Architecture Framework Technical Report," PKT-TR-ARCH1.2-V01-001229, V01 (Dec. 29, 2000).
"SDP: Session Description Protocol," RFC 2327 (Apr. 1998).
Schulzrinne et al., "Real Time Streaming Protocol (RTSP)," RFC 2326, pp. 1-92 (Apr. 1998).
Shenker et al., "Specification of Guaranteed Quality of Service," RFC 2212, pp. 1-20 (Sep. 1997).
Wroclawski, "Specification of the Controlled-Load Network Element Service," RFC 2211, pp. 1-19 (Sep. 1997).
Wroclawski, "The Use of RSVP with IETF Integrated Services," RFC 2210, pp. 1-33 (Sep. 1997).
Braden et al., "Resource ReSerVation Protocol (RSVP)—Version 1 Functional Specification," RFC 2205, pp. 1-112 (Sep. 1997).
"Cable Modem Termination System—Network Side Interface Specification," SP-CMTS-NSII01-960702, I01 (Jul. 2, 1996).
Rose et al, "Concise MIB Definitions," RFC 1212, pp. 1-19 (Mar. 1991).
Case et al, "A Simple Network Management Protocol (SNMP)," RFC 1157, pp. 1-36 (May 1990).
Rose et al, "Structure and Identification of Management Information for TCP/IP-based Internets," RFC 1155, pp. 1-22 (May 1990).
Notification of Transmittal of the International Search Report and the Written Opinion of the International Search Authority, or the Declaration for International Application No. PCT/US05/02264 (Sep. 7, 2006).
First Office Action for Canadian Application No. 2 528 871 (Jan. 24, 2012).
Non-Final Official Action for U.S. Appl. No. 12/051,374 (Jan. 18, 2012).
Interview Summary for U.S. Appl. No. 12/051,374 (Oct. 20, 2011).
First Office Action for Canadian Patent Application No. 2,528,648 (Aug. 12, 2011).
Final Official Action for U.S. Appl. No. 10/867,159 (Jul. 16, 2012).
Non-Final Official Action for U.S. Appl. No. 12/757,544 (Jun. 4, 2012).
Second Office Action for Canadian Application No. 2,528,648 (May 22, 2012).
Non-Final Official Action for U.S. Appl. No. 12/051,374 (Oct. 12, 2012).
Applicant-Initiated Interview Summary for U.S. Appl. No. 12/757,544 (Sep. 10, 2012).
First Office Action for Canadian Application No. 2,554,176 (Aug. 27, 2012).
Notice of Panel Decision from Pre-Appeal Brief Review for U.S. Appl. No. 10/867,159 (May 30, 2013).

(56) References Cited

OTHER PUBLICATIONS

Notice of Allowance for Canadian Application No. 2,528,871 (May 21, 2013).
Decision on Appeal for U.S. Appl. No. 10/867,157 (Apr. 11, 2013).
First Office Action for Canadian Application No. 2,554,177 (Mar. 11, 2013).
Third Office Action for Canadian Application No. 2,528,648 (Jan. 22, 2013).
Second Office Action for Canadian Application No. 2,528,871 (Jan. 21, 2013).
First Office Action for Chinese Application No. 200980111437.X (Jan. 4, 2013).
Final Office Action for U.S. Appl. No. 12/757,544 (Jan. 3, 2013).
Second Office Action for Canadian Application No. 2,554,177 (Jan. 10, 2014).
Extended European Search Report for European Application No. 09709156.5 (Dec. 5, 2013).
Notice of Allowance for Canadian Application No. 2,528,648 (Nov. 25, 2013).
Applicant-Initiated Interview Summary for U.S. Appl. No. 12/051,374 (Nov. 20, 2013).
Second Office Action for Canadian Application No. 2,554,176 (Nov. 12, 2013).
Advisory Action Before the Filing of an Appeal Brief for U.S. Appl. No. 12/051,374 (Oct. 31, 2013).
Second Office Action for Chinese Application No. 200980111437.X (Oct. 22, 2013).
Notice of Allowance and Fee(s) Due for U.S. Appl. No. 10/867,159 (Aug. 20, 2013).
Final Office Action for U.S. Appl. No. 12/051,374 (Aug. 8, 2013).
Notice of Allowance and Fee(s) Due for U.S. Appl. No. 10/867,157 (Jul. 22, 2013).
Non-Final Office Action for U.S. Appl. No. 12/757,544 (Jul. 8, 2013).
Extended European Search Report for European Application No. 10184422.3 (Apr. 30, 2014).
Final Office Action for Chinese Application No. 200980111437.X (Mar. 4, 2014).
Notice of Allowance and Fee(s) Due for U.S. Appl. No. 12/757,544 (Feb. 5, 2014).
Office Action for Canadian Application No. 2,840,432 (Feb. 17, 2015).
Office Action for Canadian Application No. 2,554,176 (Feb. 4, 2015).
Letter Regarding Decision to Grant for Chinese Application No. ZL200980111437.X (Feb. 3, 2015).
Notice of Allowance for Canadian Application No. 2,554,177 (Oct. 30, 2014).
Third Office Action for Chinese Application No. 200980111437.X (Aug. 11, 2014).
Reexamination Decision for Chinese Application No. 200980111437.X (Jul. 24, 2014).

* cited by examiner

VIDEO POLICY SERVER

CROSS-REFERENCE TO RELATED APPLICATIONS

This application is a continuation of "VIDEO POLICY SERVER," U.S. Non-Provisional patent application Ser. No. 11/041,779, filed Jan. 24, 2005 which claims benefit of the following U.S. Provisional Patent Applications: "VIDEO POLICY SERVER," U.S. Provisional Patent Application Ser. No. 60/538,803; filed Jan. 23, 2004 and, "POLICY BASED ADMISSION CONTROL," U.S. Provisional Patent Application Ser. No. 60/538,802, filed Jan. 23, 2004, the entire contents of which are incorporated herein by reference.

BACKGROUND OF THE INVENTION

The present invention relates to content distribution over a network, and more particularly, to managing distribution resources for video-on-demand (VOD) and other content services on a cable network.

Video-on-demand, one of several services offered by cable multiple system operators (MSOs), enables a subscriber to customize cable content according to their preferences and/or schedules. A typical VOD distribution architecture 10, shown in FIG. 1, includes a VOD server 12 and a session manager 14, a number of edge quadrature amplitude modulation (QAM) interfacing devices 16, a cable access network 18, and a set top box (STB) 20.

The VOD server 12 hosts a large volume of digital video content. Portions of this content may be selected via a request from the subscriber. (i.e., the end user). The session manager 14 is responsible for setting up a video session, i.e., processing requests from the subscriber and providing an interface between the VOD server 12 and the other components in the distribution architecture 10. The VOD server 12 and the session manager 13 are typically tightly coupled and sold as a set.

The edge QAM interfacing devices (edge QAM) 16 receive digital video content from the session manager 14, QAM-modulate and up-convert the content, then transmit resulting QAM signal onto the coaxial infrastructures within the access network 18.

The STB 20 terminates the QAM signals at the site of the subscriber and extracts the VOD content stream. The STB 20 then generates an output signal suitable for the subscriber's video equipment (e.g., televisions, recording devices, etc.).

In operation, the subscriber requests content (e.g., a movie, a nature documentary or a classic sporting event) via the STB 20. The STB 20 conveys the request to the session manager 14. The session manager 14 allocates suitable bandwidth resources in the edge QAM 16, and instructs the STB 20 to tune to the appropriate frequency spectrum for those resources. The session manager 14 then directs the VOD server 12 to begin streaming the appropriate digital content to the edge QAM 16, and the edge QAM 16 translates the digital content to the appropriate frequency spectrum.

One disadvantage of this architecture is that the edge QAM 16 is statically mapped to a particular session manager/VOD server combination, and cannot be shared with another session manager. The session manager 14 in FIG. 1 monitors and controls the resource allocation of the edge QAM 16 for VOD content to multiple subscribers. A second session manager/VOD server combination cannot share the edge QAM 16 because different session managers cannot communicate to coordinate the edge QAM resources.

For example, if a cable MSO desires to deploy a second VOD server 22 (and associated session manager 24) for hosting content different than what is on the first VOD server 12, the second VOD server 22 must deliver its content via different edge QAM 26 than that used by the first VOD server 12, as shown in FIG. 2. This arrangement represents a highly inefficient use of network resources.

SUMMARY OF THE INVENTION

In one aspect, a system for distributing digital content includes two or more digital content sources, each having a separate session manager that is distinct from other session managers associated with other digital content sources. The system further includes at least one set of network resources for receiving digital content from the two or more digital content sources, for modulating the digital content onto a carrier signal suitable for transmission over an access network, and for transmitting the carrier signal over the access network. The system also includes a receiving device for terminating the carrier signal and generating a digital content stream corresponding to the digital content from the two or more digital content sources. The system further includes a policy server for monitoring a utilization state of the network resources, and for allocating a set of bandwidth segments of the at least one set of network resources to the two or more digital content sources.

The policy server allocates the bandwidth segments according to the utilization state of the at least one set of network resources. Alternatively, the policy server may allocate bandwidth according to a set of policy rules. Policy rules may define resource allocation according to subscriber priority, or they may define resource allocation according to a category of the digital content.

The receiving device includes a set top box for generating an output signal suitable for one or more subscriber video equipment components, and each of the two or more digital content sources includes a video-on-demand server for providing video content.

The policy server issues instructions to the session manager associated with a digital content source to send video content to the at least one set of network resources. In one embodiment, the policy server is a video policy server for allocating the set of bandwidth segments of the at least one set of network resources to two or more video content sources.

The utilization state includes information about how much bandwidth of the at least one set of network resources is allocated and how much bandwidth of the at least one set of network resources is available.

In another aspect, a method of distributing digital content includes providing digital content from two or more digital content sources, each having a separate session manager that is distinct from other session managers associated with other digital content sources. The method further includes receiving, at one or more sets of network resources, digital content from the two or more digital content sources. The method also includes modulating the digital content onto a carrier signal suitable for transmission over an access network, transmitting the carrier signal over the access network, and terminating the carrier signal and generating a digital content stream corresponding to the digital content from the two or more digital content sources. The method further includes allocating, with a policy server, a set of bandwidth segments of the at least one set of network resources to the two or more digital content sources, and for monitoring a utilization state of the network resources.

In another aspect, a method of distributing digital content from a content source to a receiving device over a network includes
  sending an initiating request for digital content, from the receiving device to a session manager associated with the content source;
  sending a resource request for network resources, from the session manager to a policy server, as a result of the initiating request;
  evaluating and executing one or more policy rules to determine whether or not the resource request should be granted;
  sending an instruction from the policy server to the session manager instructing the session manager to send digital content to a specific set of network resources;
  sending receiving information for receiving the digital content to the receiving device; and,
  sending digital content from the session manager to the network resources.

The method further includes sending a notification from the policy server to the network resources notifying the network resources of a transfer of digital content from the session manager to the network resources. The network resources may include edge QAM interfacing devices. The digital content may include video content, and the content source may include one or more video-on-demand servers.

The method further includes evaluating and executing the one or more policy rules to determine how much bandwidth of the network resources should be allocated to the session manager.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The described embodiment is a cable network architecture in which a video policy server (VPS) coordinates allocation of network resources among two or more video-on-demand (VOD) servers each coupled to session managers (also referred to herein more generally as video content sources). As used herein, the term "network resources" specifically refer to edge QAM resources, but in general, the network resources may include any network components in the cable network architecture from the data source to the ultimate subscriber destination.

Although the described embodiment distributes video content across a cable network, the concepts described herein also apply to the distribution of more general digital content, such as video gaming content and other application data from two or more digital content sources. Central to this distribution of digital content is a policy server that allocates network resources to two or more digital content sources based on various considerations such as the utilization state of the network resources and a set of policy rules governing the digital content and the end consumers of the digital content (i.e., the subscribers). This general architecture allows digital content sources to share network resources, where without this architecture, each of those digital content sources would be bound to a single set of network resources.

In the described embodiment, the VPS takes on the resource allocation functionality that, for prior art architectures, typically resides in the session managers associated with VOD servers. By abstracting the allocation functionality from the session managers and centralizing it in the VPS, the described embodiment allows multiple video data sources to utilize the same set of edge QAM interface devices.

Figure 1:
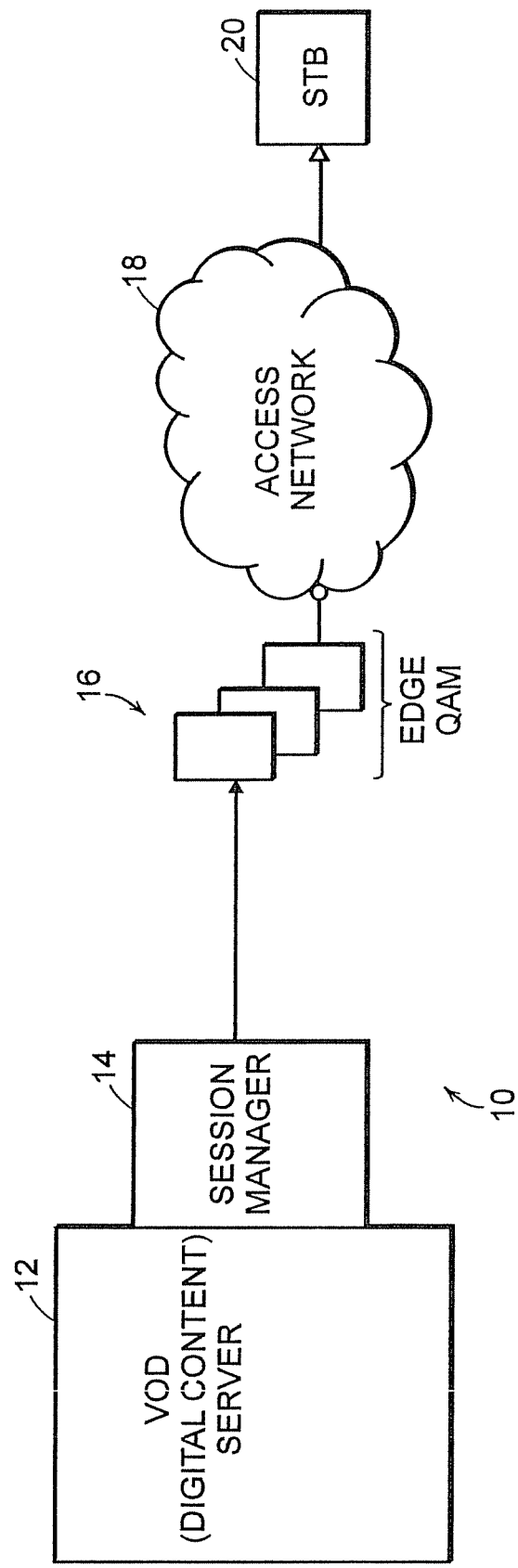
FIG. 1 shows a prior art video-on-demand content distribution architecture.
Figure 2:
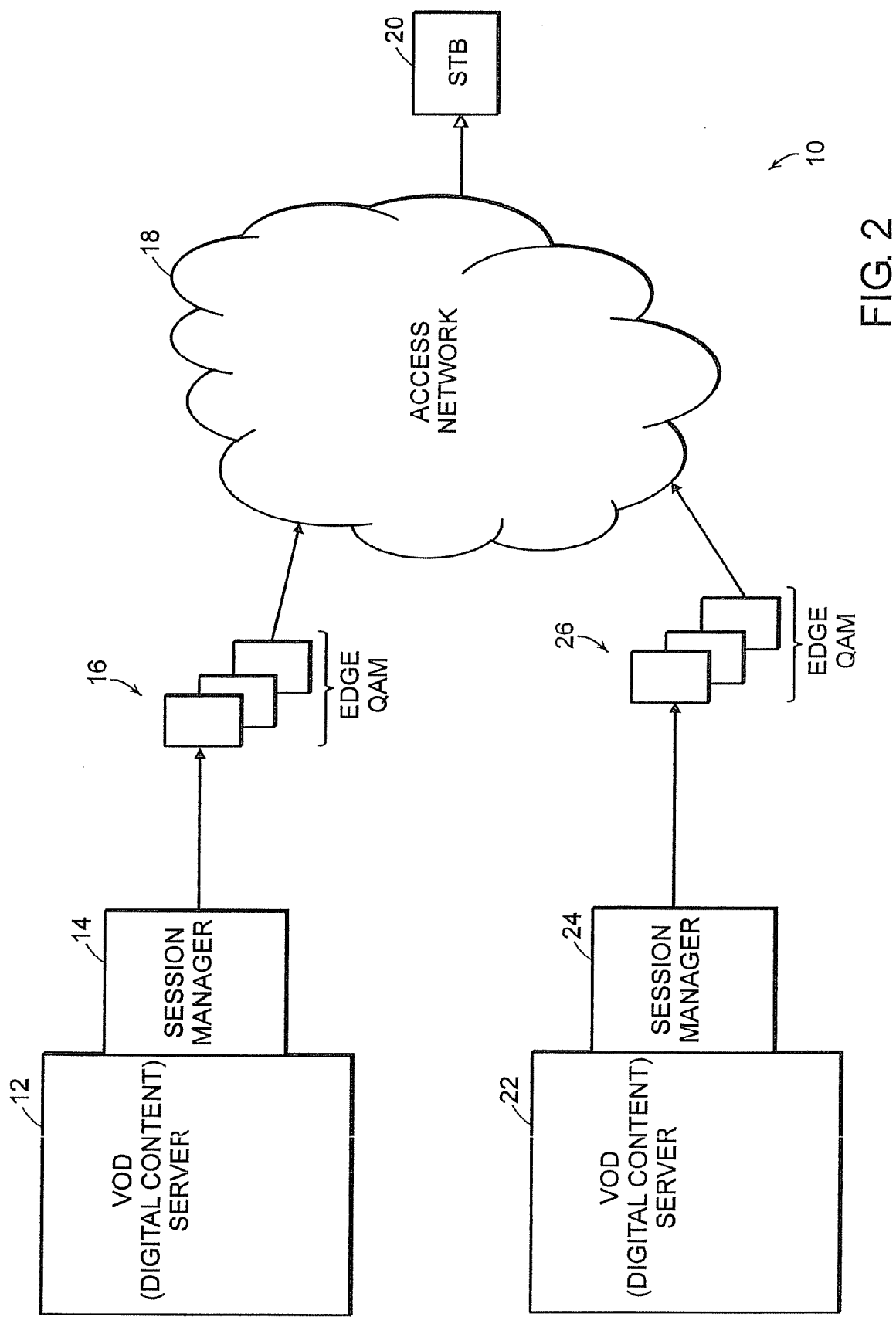
FIG. 2 shows another view of the distribution architecture in FIG. 1.
Figure 3:
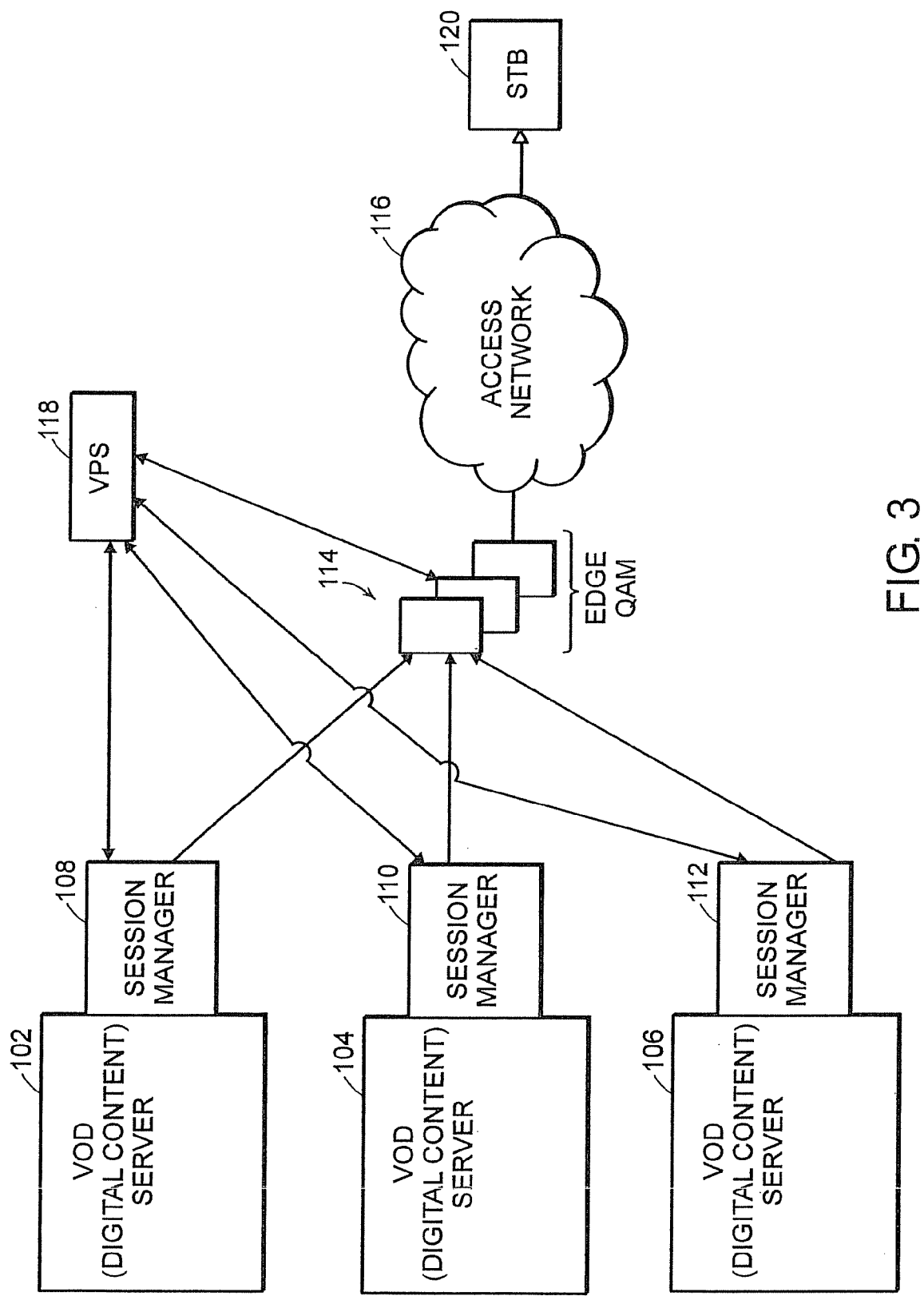
FIG. 3 shows the content distribution architecture of the described embodiment.

FIG. 3 shows the described embodiment of a policy-based admission control scheme for use in a cable network architecture. A first VOD server 102, a second VOD server 104 and a third VOD server 106, each accompanied by an associated session manager (108, 110 and 112, respectively), host digital video content.

Each VOD server 102, 104 and 106 hosts a large amount of a particular category of video content. For example, the first VOD 102 server may host full length movie content, the second VOD server 106 may host classic sports content, and the third VOD server 106 may host nature/wildlife content. Each VOD server merely streams selected video content when instructed by its associated session manager.

A session manager associated with each VOD server includes all of the functionality necessary for setting up and tearing down a video session. As used herein, a "video session" is transmission of video content from one of the VOD servers, through the cable network, with the video content terminating at the location of the subscriber. The session manager may be integrated into the VOD server, or it may be a separate component either attached to, in close proximity to, or networked with, the VOD server.

Each VOD server/session manager can provide digital video content to a set of edge QAM interfacing devices 114 (referred to herein as "edge QAM"). The edge QAM 114 modulates and up-converts the digital content from the VOD servers, then transmits the resulting QAM signal onto the coaxial infrastructures within an access network 116.

The edge QAM 114 is capable of providing a finite amount of throughput bandwidth for the digital content. In the described embodiment, the first VOD server 102, the second VOD server 104 and the third VOD server 106 can share the throughput capacity of the edge QAM 114, so that each VOD server can utilize one or more bandwidth segments of the overall edge QAM 114 throughput capacity. Each of the bandwidth segments can be any frequency width up to the total bandwidth of the edge QAM 114.

The STB 120 is a receiving device that terminates the QAM signals at the site of the subscriber and extracts the VOD content stream from the QAM signals. The STB 120 generates an output signal from the extracted VOD content stream suitable for subscriber video equipment such as televisions, video recorders and the like.

A video policy server (VPS) 118 controls how much throughput bandwidth of the edge QAM 114 each VOD/session manager uses. The VPS 118 monitors the utilization state of the edge QAM 114, i.e., how much bandwidth of the edge QAM 114 is currently being utilized, and how much of the edge QAM 114 is available.

In order for a VOD server/session manager to transmit digital video content through the edge QAM 114, the session manager must request edge QAM 114 resources from the VPS 118. The session manager specifies a particular amount of edge QAM 114 resources depending upon the nature of the digital video content to be transmitted (e.g., high definition content requires more bandwidth than ordinary video). The VPS 118 evaluates the state of the edge QAM 114 to determine if the requested resources are available. If those resources are available, and certain policy criteria are met, the VPS 118 admits the VOD server/session manager to the requested edge QAM bandwidth. Once admitted, the VOD server/session manager begins streaming the digital video to the edge QAM 114.

Once the VPS 118 allocates edge QAM bandwidth to a VOD server (for example, the first VOD server 102), the VPS 118 removes that bandwidth from consideration for allocation to other sources. The VPS 118 thus interprets the state of the edge QAM 118 as having its availability reduced by the amount of bandwidth allocated to the first VOD server 102.

The allocated bandwidth remains unavailable until relinquished by the sourcing VOD server. The allocated bandwidth may be relinquished by, for example, the expiration of a purchase period during which the subscriber can access the video, or a command from the session manager that the video data stream is complete. Once the bandwidth is relinquished, the VPS 118 considers that bandwidth available for allocation. As a result, the VPS interprets the state of the edge QAM 116 as having its availability increased by the amount of bandwidth relinquished.

As described above, the VPS 118 evaluates certain policy rules in addition to resource availability before allocating resources to a video source. Such policy rules allow for smooth integration of VOD with other data types within the network (e.g., high speed internet access, voice-over-IP, video conferencing, etc.). One type of policy may give priority to certain data types. For example, policy rules may give resource requests from certain data sources preferential treatment by giving them higher priority access to the available resources. Further, policy rules can allow certain high priority data sources to preempt a lower priority data stream that is currently using allocated resources.

Another type of policy may give priority to particular subscribers, creating a kind of "tier" system. For example, consider a three-tier system where the highest-priority tier is the 'gold' tier, the next highest priority tier is the 'silver' tier, and the lowest tier is the 'bronze' tier. Policy rules involving subscriber tiers give preferential treatment to higher tiers, for which subscribers in those tiers pay a premium price. One exemplary tier-based rule may be:

if ((subscriber_tier==bronze)&&(current_network_utilization>80%)) then reject

With this rule, an allocation request for a bronze-tier subscriber will be rejected if the current resource allocation is greater than 80 percent. This and other tier-based policy rules thus function to bias network availability towards the higher paying subscribers.

Figure 4:
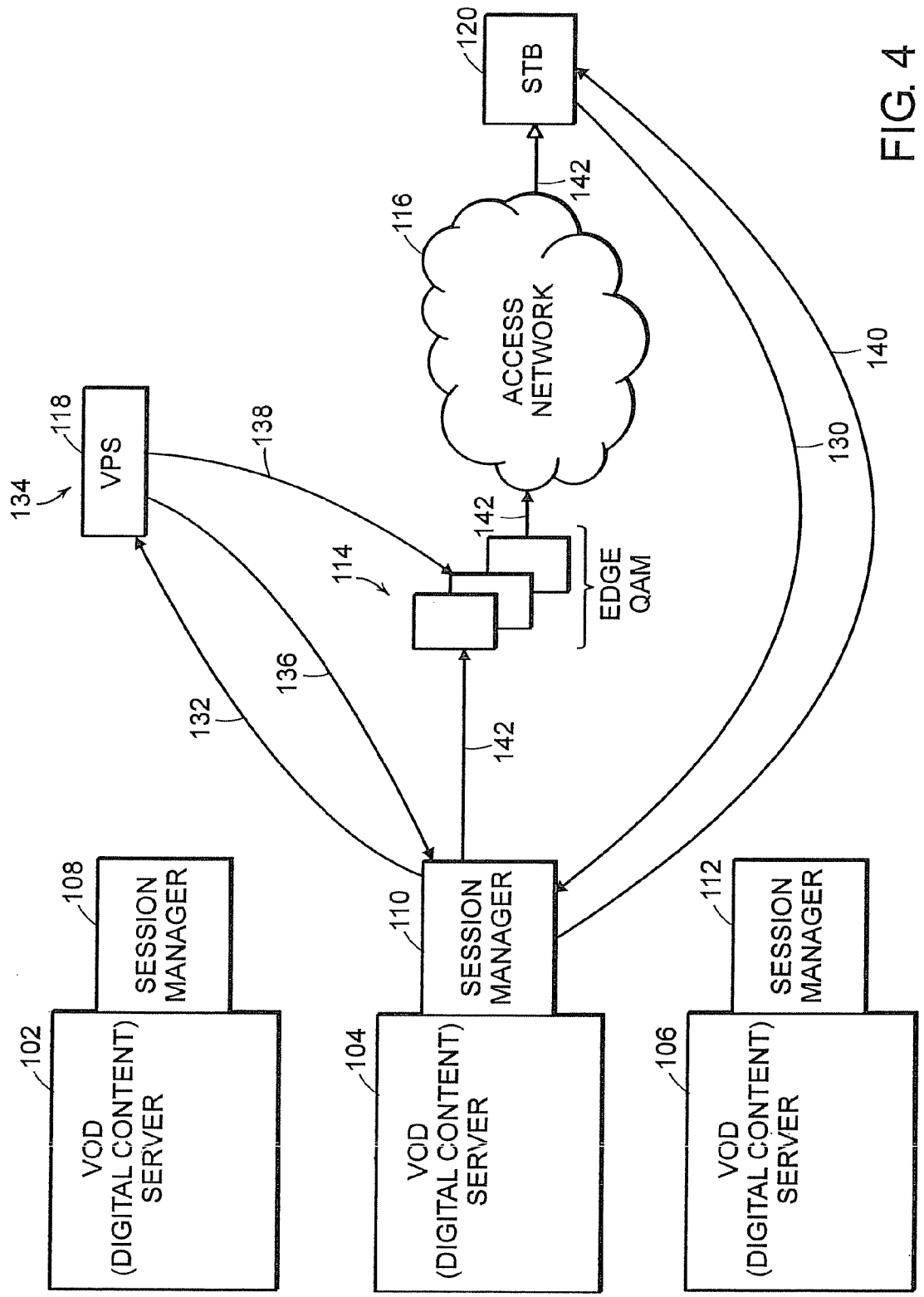
FIG. 4 shows a series of steps for setting up a video session using the architecture in FIG. 3.

FIG. 4 illustrates a series of steps for setting up a video session and the corresponding allocation of resources at the edge QAM 116. In this example, a subscriber requests, via the set top box (STB) 120, digital video data from the second VOD server 104 and the associated session manager 110. Although this example shows the steps for setting up a session from one particular VOD server and session manager, these steps apply for a session with respect to any of the other VOD sources.

In the first step 130, the STB 120 requests particular VOD content from the session manager 110 associated with the relevant VOD server 104. The STB 120 determines which of the three is the relevant VOD server and session manager based upon (i) configuration data within the STB 120 and (ii) the nature of the requested VOD content. In this exemplary case, the STB 120 sends the request to the second session manager 110 because its associated VOD server 104 hosts the particular type of VOD content the subscriber desires (e.g., a recently released movie).

In the second step 132, the session manager 110 sends a request to the VPS 118 for resource allocation (in this case, edge QAM 114 resources). This request includes information such as subscriber ID, subscriber service tier, priority of the content, and streaming characteristics (e.g., constant bit rate/variable bit rate, bandwidth requirements, etc.).

In the third step 134, the VPS 118 evaluates and executes the policy rules defined by the MSO, while considering various factors, in order to decide whether to allocate network resources to the session manager 110. Such factors include the current utilization state of the network resources, the service tier of the requesting subscriber, the nature of the content being requested, among others.

In the fourth step 136, the VPS 118 instructs the service manager 110 to send the requested video content to a particular IP address and UDP port. This occurs only if the results of executing the policy rules indicate such instruction is an appropriate action, and if sufficient network resources are available. If the result of executing the policy rules indicate such instruction is an inappropriate action, the VPS 118 does not respond to the service manager. Alternatively, the VPS 118 may respond to the session manager 110 with a message indicating the request for resource allocation has been denied.

In some cases, the network resources needed to fulfill the request from the subscriber will not be available, or the policy rules will not allow use of the resources. In these cases the VPS 118 will not allocate network resources to the session manager 110. Alternatively, the VPS 118 may provide the service manager with alternatives such as using a lower bit-rate stream or sending a request to another VOD server hosting similar content.

In the fifth step 138, the VPS 118 notifies the relevant edge QAM 114 to expect the video data stream from the session manager 110 and to take any necessary actions. Such actions may include converting the video data to a lower bit rate, changing from constant bit rate to variable bit rate, or other processing actions unique to the incoming VOD content.

In the sixth step 140, the session manager 110 communicates tuning and other information to the STB 120 necessary for receiving the requested VOD content. Such information includes which frequency channel will carry the video content, which MPEG program to monitor for a particular video stream, etc.

In the seventh step 142, the session manager 110 begins to stream the requested VOD content to the edge QAM 114, which converts the VOD content stream to the appropriate format for viewing via the STB. The QAM 114 modulates and up-converts the VOD content stream, then transmits the resulting QAM signal onto the coaxial infrastructures within an access network 116.

In some cases, the subscriber may choose to "pause" the video session described above once the session is established, and the VPS 118 may take different actions as a result depending on policy rules. For example, a subscriber may purchase a time slot (e.g., 24 hours) during which the subscriber can watch the content as many times as he or she desires. During this time slot, the subscriber may stop watching the content before it ends, assuming he or she will return later to watch the remainder of the content. In this case, the service manager 110 informs the VPS 118 of the interruption, and the VPS 118 may release the reserved resources until the subscriber resumes watching the content. Policy rules may, for example, dictate that those resources will not be released for higher-level subscriber tiers, so that the resources are guaranteed to be available for the entire time slot.

The above examples do not specify particular communication protocols among the various components. In general, any protocol appropriate for the particular media and content may be used for the communication described above. Specific examples of communication protocols for the above communications are listed below.

I) Communication between the STB 120 and the session manager 110:
   1. DSMCC—(Digital Storage Media—Command and Control): See ISO/IEC JTC1/SC29/WG11.
   2. RTSP—(Real Time Streaming Protocol): See RFC-2326 (April 1998).

II) Communication between the session manager 110 and the VPS 118:
   1. RTSP.
   2. XML (eXtensible Markup Language).
   3. HTTP (HyperText Transfer Protocol).
   4. RSVP—(Resource reSerVation Protocol): See RFC-2205 (September 1997).

III) Communication between the VPS 118 and the edge QAM 116:
   1. SNMP (Simple Network Management Protocol) See RFCs 1155, 1157, and 1212 for SNMPv1 and RFCs 1441 through 1452 for SNMPv2.
   2. XML.
   3. HTTP.

Other aspects, modifications and embodiments are within the scope of the claims.

What is claimed is:

1. A system for distributing digital content, comprising:
two or more video-on-demand digital content servers, each having a separate session manager that is distinct from other session managers associated with other video-on-demand digital content servers, wherein each of the video-on-demand digital content servers comprises a network component;
at least one set of network resources comprising network components that are separate from the network components of the video-on-demand digital content servers for (i) receiving digital content from the two or more video-on-demand digital content servers, (ii) modulating the digital content onto a carrier signal suitable for transmission over an access network, and (iii) transmitting the carrier signal over the access network, wherein the network resources include edge quadrature amplitude modulation (QAM) interfacing devices;
a receiving device for terminating the carrier signal and generating a digital content stream corresponding to the digital content from the two or more video-on-demand digital content servers;
a policy server comprising a network component separate from the network components of the video-on-demand digital content servers and from the network components of the network resources for monitoring a utilization state of the network resources, wherein monitoring the utilization state of the network resources includes monitoring the utilization state of the QAM interfacing devices, for receiving, from the video-on-demand digital content servers, requests for allocation, and for allocating, in response to the requests and based on the utilization state, a set of bandwidth segments of the QAM interfacing devices to the video-on-demand digital content servers, wherein the policy server allocates the set of bandwidth segments of the QAM interfacing devices to the video-on-demand digital content servers in response to the utilization state of the network resources indicating that previously allocated bandwidth segments of the QAM interfacing devices are available.

2. The system of claim 1, wherein the policy server allocates the bandwidth segments according to the utilization state of the at least one set of network resources.

3. The system of claim 1, wherein the policy server allocates the bandwidth segments according to a set of policy rules.

4. The system of claim 3, wherein the policy rules define resource allocation according to subscriber priority.

5. The system of claim 3, wherein the policy rules define resource allocation according to a category of the digital content.

6. The system of claim 1, wherein each of the two or more video-on-demand digital content servers includes a video-on-demand server for providing video content.

7. The system of claim 1, wherein the receiving device includes a set top box for generating an output signal suitable for one or more subscriber video equipment components.

8. The system of claim 1, wherein the policy server issues instructions to the session manager associated with a video-on-demand digital content server to send video content to the at least one set of network resources.

9. The system of claim 1, wherein the policy server is a video policy server for allocating the set of bandwidth segments of the at least one set of network resources to the two or more video-on-demand digital content servers.

10. The system of claim 1, wherein the utilization state includes information about how much bandwidth of the at least one set of network resources is allocated and how much bandwidth of the at least one set of network resources is available.

11. A method of distributing digital content, comprising:
providing digital content from two or more video-on-demand digital content servers, each having a separate session manager that is distinct from other session managers associated with other video-on-demand digital content servers, wherein each of the video-on-demand digital content servers comprises a network component;
receiving, at one or more sets of network resources comprising network components that are separate from the network components of the video-on-demand digital content servers, digital content from the two or more video-on-demand digital content servers;
modulating the digital content onto a carrier signal suitable for transmission over an access network;
transmitting the carrier signal over the access network;
terminating the carrier signal and generating a digital content stream corresponding to the digital content from the two or more video-on-demand digital content servers;
receiving, at a policy server comprising a network component separate from the network components of the video-on-demand digital content servers and from the network components of the network resources, requests from the video-on-demand digital content servers for resource allocation;
monitoring, by the policy server, utilization state of the network resources, wherein the network resources include edge quadrature amplitude modulation (QAM) interfacing devices, wherein monitoring the utilization state of the network resources includes monitoring the utilization state of the QAM interfacing devices; and
allocating, by the policy server, in response to the requests from the video-on-demand digital content servers and based on the utilization state, a set of bandwidth segments of the QAM interfacing devices to the two or more video-on-demand digital content servers, and for monitoring a utilization state of the network, wherein the policy server allocates the set of bandwidth segments of the QAM interfacing devices to the video-on-demand digital content servers in response to the utilization state of the network resources indicating that previously allocated bandwidth segments of the QAM interfacing devices are available.

12. The method of claim 11, further including allocating, using policy rules, the bandwidth segments according to the utilization state of the at least one set of network resources.

13. The method of claim 11, further including allocating, using policy rules, the bandwidth segments according to a set of policy rules.

14. The method of claim 13, further including defining resource allocation according to subscriber priority.

15. The method of claim 13, further including defining resource allocation according to a category of the digital content.

16. The method of claim 11, further including issuing instructions from the policy server to the session manager associated with a video-on-demand digital content server to send video content to the at least one set of network resources.

17. A method of distributing digital content from a video-on-demand digital content server to a receiving device over a network, comprising:
sending an initiating request for digital content, from the receiving device to a session manager associated with the video-on-demand digital content server, the video-on-demand digital content server comprising a network component;
sending a resource request for network resources comprising network components separate from the network component of the video-on-demand digital content server, from the session manager to a policy server comprising a network component separate from the network component of the video-on-demand digital content server and the network components of the network resources;
at the policy server, in response to the request from the video-on-demand digital content server, evaluating and executing one or more policy rules to determine whether or not the resource request should be granted, wherein evaluating and executing one or more policy rules includes monitoring the utilization state of the network resources including the QAM interfacing devices, wherein the policy server allocates at least one bandwidth segment of the QAM interfacing devices to the video-on-demand digital content server in response to the utilization state of the network resources indicating that previously allocated bandwidth segments of the QAM interfacing devices are available;
sending an instruction from the policy server to the session manager instructing the session manager to send digital content to the specific set of network resources;
sending receiving information for receiving the digital content to the receiving device; and
sending digital content from the session manager to the network resources.

18. The method of claim 17, further including sending a notification from the policy server to the network resources notifying the network resources of a transfer of digital content from the session manager to the network resources.

19. The method of claim 17, wherein the policy rules define resource allocation according to subscriber priority.

20. The method of claim 17, wherein the policy rules define resource allocation according to a category of the digital content.

21. The method of claim 17, furthering including evaluating and executing the one or more policy rules to determine how much bandwidth of the network resources should be allocated to the session manager.

22. A method for operating a policy server, the method comprising:
at a policy server comprising a network component separate from network components of video-on-demand digital content servers:
receiving, from the video-on-demand digital content servers, requests for resource allocation;
monitoring a utilization state of network resources comprising network components separate from network components of the video-on-demand digital content servers and the network component of the policy server, wherein the network resources are associated with delivering media content to terminating devices, wherein the network resources include edge quadrature amplitude modulation (QAM) interfacing devices, wherein monitoring the utilization state of the network resources includes monitoring the utilization state of the QAM interfacing devices; and
allocating, in response to the requests and based on the utilization state, bandwidth segments of the, QAM interfacing devices to the digital content servers, wherein the policy server allocates the bandwidth segments of the QAM interfacing devices to the digital content servers in response to the utilization state of the network resources indicating that previously allocated bandwidth segments of the QAM interfacing devices are available.

23. The system of claim 1 wherein the policy server allocates the bandwidth segments utilizing policy rules that define resource allocation according to one of a plurality of subscriber tiers.

24. The method of claim 11 wherein allocating the bandwidth segments includes utilizing policy rules that define resource allocation according to one of a plurality of subscriber tiers.

25. The method of claim 17 wherein the policy rules define resource allocation according to one of a plurality of subscriber tiers.

26. The method of claim 22 wherein allocating the bandwidth segments includes utilizing policy rules that define resource allocation according to one of a plurality of subscriber tiers.

* * * * *